United States Patent [19]

Gordon

[11] Patent Number: 5,499,337
[45] Date of Patent: Mar. 12, 1996

[54] STORAGE DEVICE ARRAY ARCHITECTURE WITH SOLID-STATE REDUNDANCY UNIT

[75] Inventor: David W. Gordon, Boulder, Colo.

[73] Assignee: EMC Corporation, Hopkinton, Mass.

[21] Appl. No.: 324,155

[22] Filed: Oct. 14, 1994

Related U.S. Application Data

[63] Continuation of Ser. No. 767,066, Sep. 27, 1991, abandoned.

[51] Int. Cl.$^6$ ................................................. G06F 11/00
[52] U.S. Cl. ........................... 395/182.04; 395/182.09; 371/40.1; 364/268.3; 364/268.9; 364/242.91; 364/DIG. 1
[58] Field of Search ....................... 371/40.4, 2.2, 371/10.1, 10.3, 13, 21.1, 21.2, 22.2, 29.5, 40.1–40.3; 395/275, 400, 425, 575, 800, 182.04, 182.09; 364/242.9, 242.91, 249, 265.3, 268.3, 268.5, 268.9

[56] References Cited

U.S. PATENT DOCUMENTS

| | | | |
|---|---|---|---|
| 3,893,178 | 7/1975 | Sordello | 350/73 |
| 4,092,732 | 5/1978 | Ouchi | 364/200 |
| 4,467,421 | 8/1984 | White | 364/200 |

(List continued on next page.)

OTHER PUBLICATIONS

Ousterhout, J., and Douglis F.; Beating the I/O Bottleneck: A Case For Log–Structured File Systems; Aug. 4, 1988.
Patterson, D. A., Gibson, G., and Katz, H.; A Case For Redundant Arrays of Inexpensive Disks (RAID).
Lee, E. K.; Software and Performance Issues in the Implementation of a RAID Prototype (May 1990).
Chen, P., Gibson, G., Katz, R. H., Patterson, D. A., and Schulze, M.; Introduction to Redundant Arrays of Inexpensive Disks (RAID) (Dec. 1988).
Chen, P., Gibson, G., Katz, R. H., Patterson, D. A., and Schulze, M., et al. Evolution of the Raid 2 Architecture (Jun. 12, 1990).
Maximum Strategy, Inc., San Jose, CA; Strategy 2 Disk Array Controller Operation Manual (Nov. 2, 1988).
Maximum Strategy, Inc., San Jose, CA; Strategy 1 Disk Array Controller Operation Manual (Date unknown).
Gibson, G. A., Performance and Reliability in Redundant Arrays of Inexpensive Disks (Date unknown).
Chen, P., An Evaluation of Redundant Arrays of Disks Using an Amdahl 5890; (May 1989).
Katz, R. H., Gibson, G. A., and Patterson, D. A.; Disk System Architectures for High Performance Computing (Mar. 1989).
Gray, J., Horst, B., and Walker, M.; Parity Striping of Disc Arrays: Low–Cost Reliable Storage with Acceptable Throughput (Jan. 1990).
Schultz, M. E.; Considerations in the Design of a Raid Prototype (Aug. 1988).
Clark, and Corrigan; IBM Systems Journal, vol. 23, No. 3, 1989.

*Primary Examiner*—Robert W. Beausoliel, Jr.
*Assistant Examiner*—Dieu-Minh Le
*Attorney, Agent, or Firm*—Fish & Richardson

[57] ABSTRACT

A fault-tolerant storage device array using a solid-state storage unit for storage of redundancy information. The invention solves the redundancy bottleneck inherent in a RAID 4 architecture by replacing the electro-mechanical redundancy storage unit with a solid-state device (SSD). The present invention requires reading an old data block from a storage unit and an old redundancy data block from the SSD, then combining the old data block, a new data block, and the old redundancy data block to generate a new redundancy data block, and thereafter writing the new data block to a storage unit and the new redundancy data block to the SSD. However, reading the old redundancy data block from the SSD and writing the new redundancy data block to the SSD at electronic speeds takes a negligible amount of time compared to the Read and Write times of a typical rotating disk storage unit. While the storage unit on which a new data block will be stored is involved for the duration of each data modification operation, the involvement of the SSD in the operation ceases upon writing the new redundancy data block. Thereafter, the SSD is available for updating a redundancy data block for a next storage unit.

18 Claims, 7 Drawing Sheets

U.S. PATENT DOCUMENTS

| | | | |
|---|---|---|---|
| 4,562,576 | 12/1985 | Ratcliffe | 371/21.1 |
| 4,667,326 | 5/1987 | Young et al. | 371/40.1 |
| 4,722,085 | 1/1988 | Flora et al. | 37/38.1 |
| 4,754,397 | 6/1988 | Varaiya et al. | 369/75.1 |
| 4,761,785 | 8/1988 | Clark et al. | 371/38.1 |
| 4,768,193 | 8/1988 | Takemae | 371/10.1 |
| 4,775,978 | 10/1988 | Hartness | 371/38.1 |
| 4,817,035 | 3/1989 | Timsit | 371/38.1 |
| 4,849,929 | 3/1989 | Timsit | 371/10.1 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,989,206 | 1/1991 | Dunphy, Jr. et al. | 371/40.4 |
| 4,993,030 | 2/1991 | Krakauer et al. | 371/40.1 |
| 5,088,081 | 2/1992 | Farr | 371/10.1 |
| 5,130,992 | 7/1992 | Frey, Jr. et al. | 371/40.1 |
| 5,134,619 | 7/1992 | Hensen et al. | 371/40.1 |
| 5,146,574 | 9/1992 | Grajjar et al. | 395/425 |
| 5,185,876 | 2/1993 | Nguyen et al. | 395/425 |
| 5,235,601 | 8/1993 | Stallmo et al. | 371/40.1 |
| 5,257,367 | 10/1993 | Goodlander et al. | 395/600 |
| 5,274,799 | 12/1993 | Brant et al. | 395/575 |

STORAGE DEVICE ARRAY ARCHITECTURE WITH SOLID-STATE REDUNDANCY UNIT

This is a continuation of application Ser. No. 07/767,066 filed on Sep. 27, 1991, now abandoned.

BACKGROUND OF THE INVENTION

1. Field of the Invention

This invention relates to computer system data storage, and more particularly to a fault-tolerant storage device array using a solid-state storage unit for storage of redundancy information.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various type of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units.

Other approaches to such "external" reliability have been described in the art. A research group at the University of California, Berkeley, in a paper entitled "A Case for Redundant Arrays of Inexpensive Disks (RAID)", Patterson, et al., *Proc. ACM SIGMOD,* June 1988, has catalogued a number of different approaches for providing such reliability when using disk drives as storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives (this is also known as "bit striping"). For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement also effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive ORed" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units, A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" sequence.

Thus, a Read and a Write on the single parity unit occurs each time a record is changed on any of the data storage units covered by the parity record on the parity unit. The parity unit becomes a bottle-neck to data writing operations since the number of changes to records which can be made per unit of time is a function of the access rate of the parity unit, as opposed to the faster access rate provided by parallel operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage device containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

Thus, no single disk drive is used for storing the parity information, and the bottleneck of the RAID 4 architecture is eliminated. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising two Read and two Write operations: the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole.

Despite the Write performance penalty, RAID 5 type systems have become increasingly popular, since they provide high data reliability with a low overhead cost for redundancy, good Read performance, and fair Write performance. However, it would be desirable to have the benefits of a RAID 5 system without the Write performance penalty resulting from the rotational latency time imposed by the redundancy data update operation.

The present invention provides such a system.

SUMMARY OF THE INVENTION

The current art teaches away from a RAID 4 architecture for OLTP systems, because Write operations (requiring a Read-Modify-Write sequence) become bottlenecked at the fixed parity disk drive. So far as known, all RAID-type OLTP systems use a RAID 5 architecture, in which redundancy information is distributed throughout all storage units.

The present invention solves the redundancy bottleneck inherent in a RAID 4 architecture by replacing the redundancy storage unit with a solid-state device (SSD). The SSD may be based on random access memory (RAM) circuits, bubble-memories, or any other suitably fast solid-state memory elements or circuits. For fault-tolerance, the SSD may be battery-backed up if volatile memory elements or circuits are used, and mirrored or (preferably) ECC protected (e.g., via a Hamming or Reed-Solomon code).

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiment and examples shown should be considered as exemplars, rather than limitations on the method of the present invention.

Figure 1:
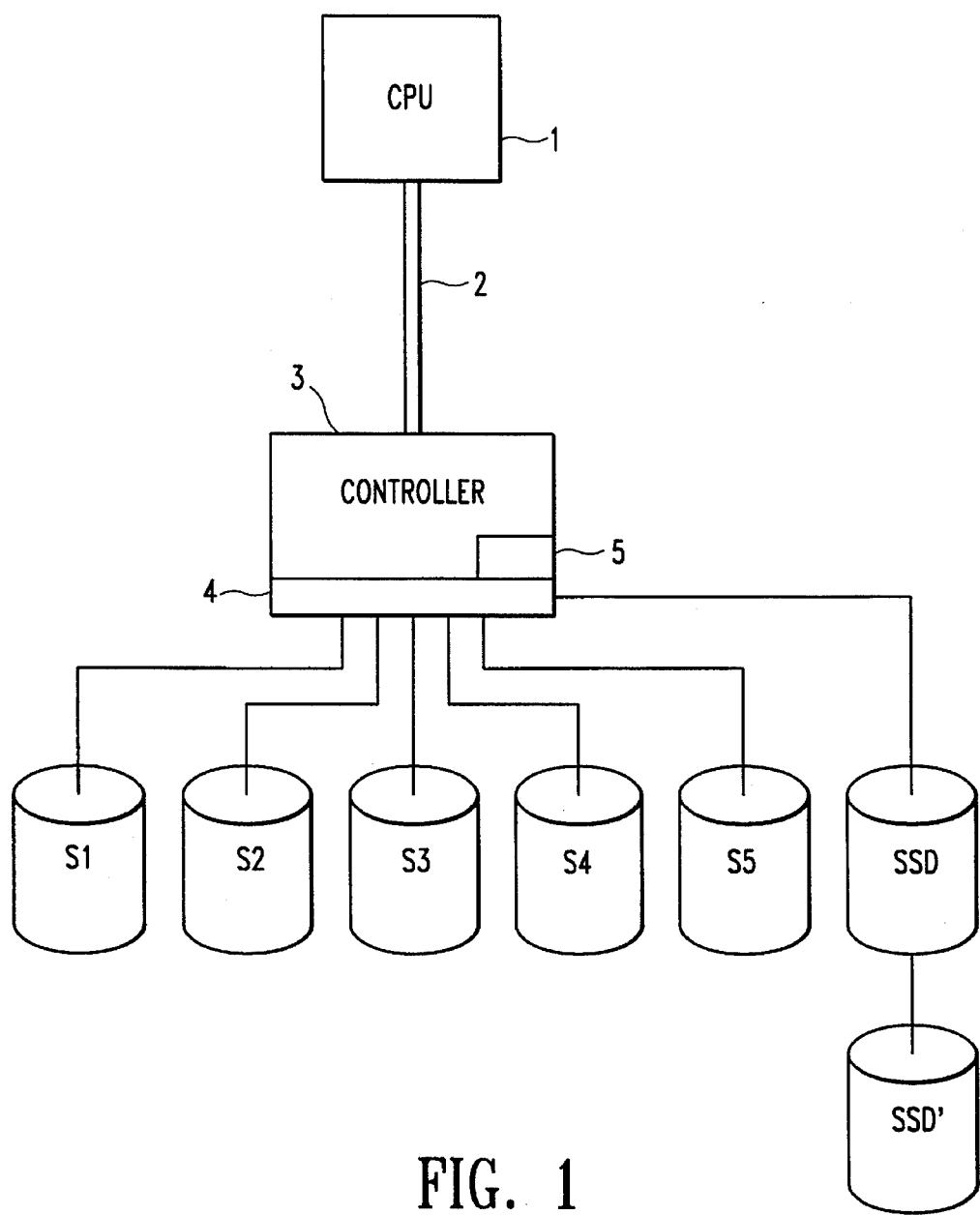
FIG. 1 is block diagram of a RAID 4 system in accordance with the present invention.

FIG. 1 is block diagram of a solid state redundancy unit RAID system in accordance with the present invention. Shown are a CPU 1 coupled by a bus 2 to an array controller 3. The array controller 3 preferably includes a buffer memory 4 and a redundancy data computation circuit 5, and is coupled to each of the plurality of data storage units S1–S5 (five being shown by way of example only) by an I/O bus (e.g., a SCSI bus). The storage units S1–S5 are failure independent, meaning that the failure of one unit does not affect the physical operation of other units. The array controller 3 preferably includes a separately programmable processor (for example, the MIPS R3000 RISC processor, made by MIPS Corporation of Sunnyvale, Calif.) which can operate independently of the CPU 1 to control the storage units S1–S5.

Also attached to the controller 3 is a solid state device redundancy data unit SSD. The SSD may be based on random access memory (RAM) circuits, bubble-memory devices, or any other suitably fast solid-state memory elements or circuits. The SSD is preferably configured to mimic the I/O characteristics of the data storage units S1–S5, so that the controller 3 need not be specially programmed or equipped to communicate with a different type of device interface. For example, if the storage units S1–S5 are SCSI-compatible magnetic disk drives, then the SSD should have a SCSI-compatible interface. Such solid state device units are known in the art.

For fault-tolerance, the SSD may have a battery power supply as well as a primary power supply if volatile data storage elements or circuits are used (e.g., CMOS RAM). The battery power supply supplies data-preserving power to the volatile data storage elements in the event of a failure of the primary power supply. The SSD may also be mirrored to provide additional fault-tolerance. In FIG. 1, a mirror solid state device redundancy unit SSD' is shown coupled to the controller 3 such that all data written to the solid state device redundancy unit SSD is also written essentially simultaneously to the mirror solid state device redundancy unit SSD', in known fashion.

Optionally, the SSD may be ECC protected (e.g., via a Hamming or Reed-Solomon code), in known fashion, to detect and correct at least single-bit errors in data words stored therein.

The storage units S1–S5 can be grouped into one or more redundancy groups. In the illustrated examples described below, the redundancy group comprises all of the storage units S1–S5, for simplicity of explanation.

Figure 2:
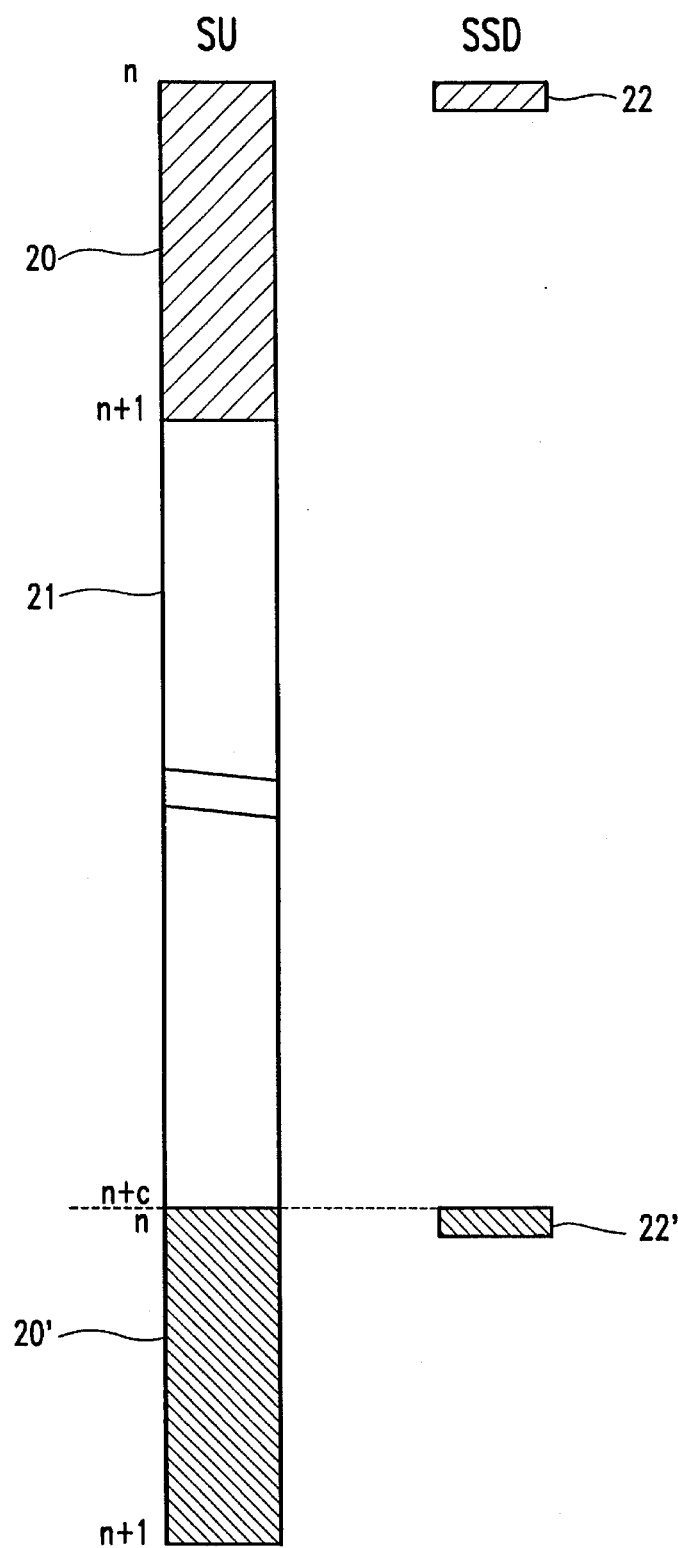
FIG. 2 is a diagram of the operational sequence and relative times typical of a Read-Modify-Write operation in a first embodiment of the present invention.

FIG. 2 diagrammatically shows the operational sequence and relative times typical of a Read-Modify-Write operation in a first embodiment of the present invention. One of the tracks of a storage unit SU (being any of the storage units S1–S5) is shown as linear array of storage locations; the length of the array is also indicative of the time required to traverse the length. The data to be modified is in block (or sector or cluster) 20, starting at address n and ending at address n+1. The data in block 20 is re-written at the same location, indicated as block 20'. Thus, to modify block 20 on storage unit SU, (1) block 20 must pass under a Read/Write transducer and the old data Read from the block and transmitted to the controller 3 for combination with the corresponding redundancy data (e.g., XOR'ing with parity data), (2) the intervening space, or rotational latency gap, 21 between the end n+1 of block 20 and the end n+c of the gap 21 (corresponding to the beginning n of block 20') must pass under the transducer, and (3) block 20' must again pass under the Read/Write transducer, which Writes the modified data from the controller 3 into the block 20'.

If the track containing block 20 has, for example, 35 blocks, the time for the rotational latency gap 21 to pass the Read/Write transducer will comprise 34/(35+1), or about 94%, of the time necessary to begin reading block 20 and finish writing block 20' (which comprise the same physical block). In a typical RAID 4 or RAID 5 system, two storage units are involved in each Read-Modify-Write operation. Thus, in such systems, updating a single block can occupy about 94% of the availability of two storage units. (On the other hand, the time to modify an entire track of data is only about twice the time required to modify a single block, since the consecutive blocks on a track are in essence "pipelined", and the transducer need pass over an entire track only twice).

FIG. 2 also diagrammatically shows the Read and Write cycle times of an SSD used for storing the redundancy data for storage units S1–S5. The redundancy data 22 corresponding to block 20 in storage unit SU is Read from the SSD when the data in block 20 is to be modified. The redundancy data 22, the old data in block 20, and the new data to be written in block 20' are combined (e.g., if the redundancy data is parity information, by XOR'ing all three items) to generate new redundancy data (indicated as 22') to be stored in the SSD (preferably in the same location; by using memory mapping, different physical locations can be used at different times to correspond to the same logical location). A buffer memory (which can be part of buffer memory 4) may be used to buffer the redundancy data 22 Read from the SSD, in order to match data rates with and the availability of output from a storage unit.

Figure 3:
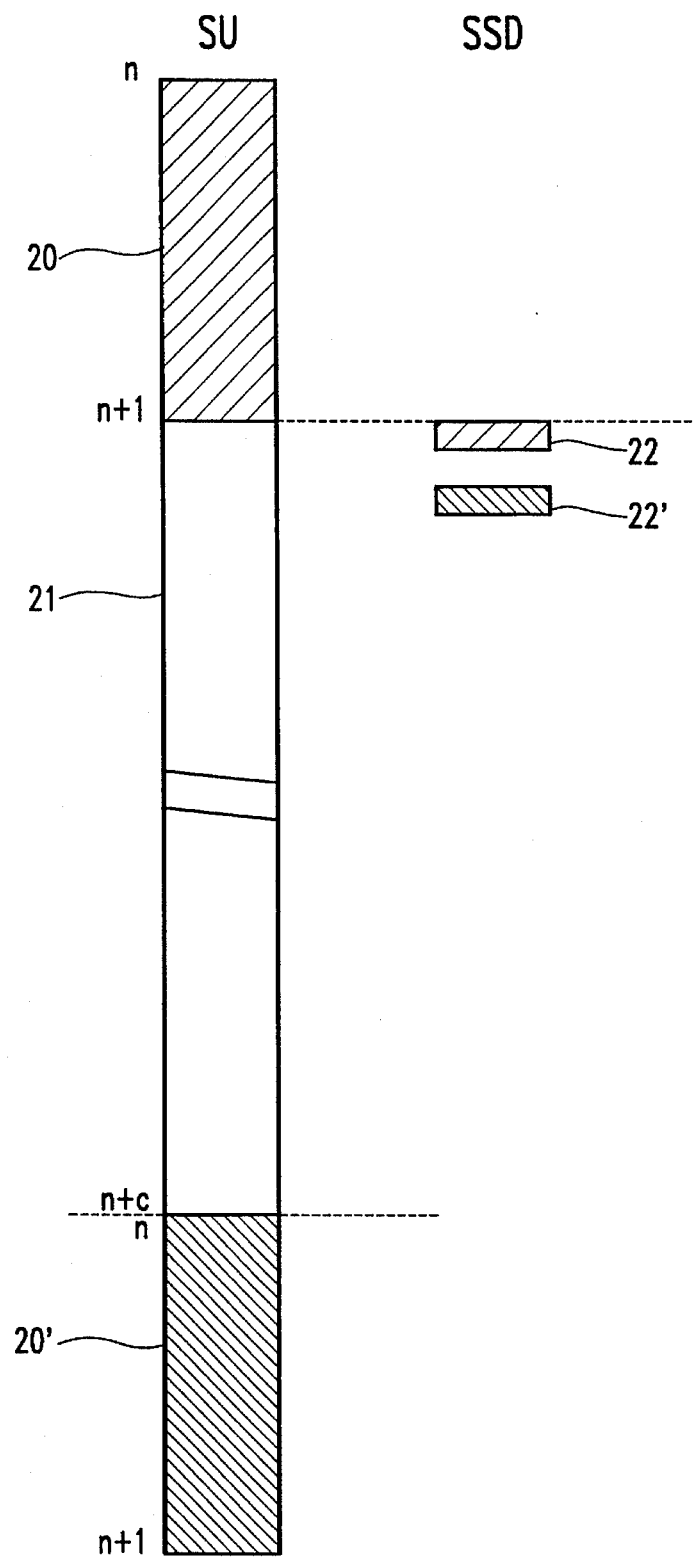
FIG. 3 is a diagram of the operational sequence and relative times typical of a Read-Modify-Write operation in a second embodiment of the present invention.

FIG. 2 shows that the redundancy data 22 in the SSD corresponding to the data in block 20 is Read beginning at the same time as block 20 begins to be Read, and that there is a Write of the new redundancy data 22' beginning at the same time as a Write operation to block 20' begins. However, this relative timing of Read and Write operations can be altered as desired to accommodate different optimizations of the system. For example, FIG. 3 depicts a diagram of the operational sequence and relative times typical of a Read-Modify-Write operation in a second embodiment of the present invention. In this embodiment, the data Read from the storage unit SU is transmitted to the buffer memory 4 in the controller 3. Further, the Read cycle time for the buffer memory 4 and the process time of the redundancy data computation circuit 5 respectively approximate the Read cycle time from the SSD and the Write cycle time to the SSD from the controller 3. Therefore, the old redundancy data can be Read from the SSD shortly after block 20 is Read and transmitted to the buffer memory 4, the old data, new data (already available to the controller 3), and old redundancy data 22 processed through the redundancy data computation circuit 5, and the new redundancy data 22' temporarily stored in the buffer memory 4 and then written back into the SSD, all independently of the writing of the new data to block 20'.

Figure 4:
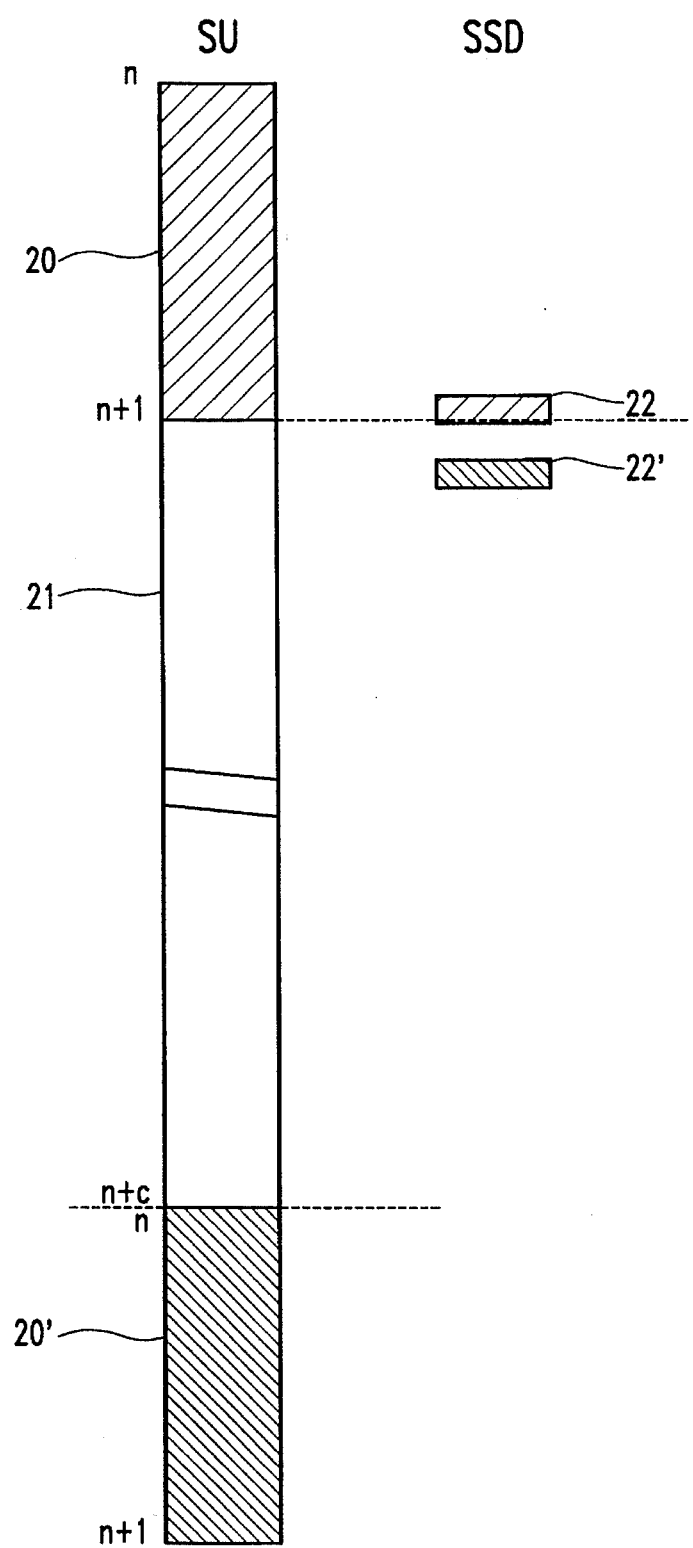
FIG. 4 is a diagram of the operational sequence and relative times typical of a Read-Modify-Write operation in a third embodiment of the present invention.

Alternatively, if the buffer memory 4 has a dual-port architecture, meaning that two different locations can be accessed simultaneously, the old redundancy data can be Read from the SSD shortly before block 20 is fully Read from the storage unit SU, as shown in FIG. 4. As the remainder of block 20 is Read from the storage unit SU and stored in the buffer memory 4 through a first port, the first part of the data from block 20 can be concurrently accessed through the second port of the buffer memory 4 and transmitted to the redundancy data computation circuit 5. Meanwhile, the corresponding redundancy data is concurrently Read from the SSD and also transmitted to the redundancy data computation circuit 5. (Some buffering may have to be done with respect to the redundancy data Read from the SSD, in order to match speeds with the memory buffer 4 and assure bit alignment between the old data and old redundancy data before being applied to the redundancy data computation circuit 5). The new redundancy data can then be temporarily stored in the buffer memory 4 and thereafter written back into the SSD, either immediately (as shown in FIG. 4), or in accordance with some scheduling priority. In either event, the data rate with respect to the SSD is so much faster than the data rate of the storage unit SU, that the SSD can complete the Write operation of the new redundancy data 22' well before the storage unit SU competes the Write portion of its Read-Modify-Write operation. With buffering of the new redundancy data 22', the Write to the SSD can be delayed beyond the completion of the Write operation to block 20'.

More generally, the scheduling of the Read of the old redundancy data 22 from the SSD and the Write of the new redundancy data 22' to the SSD can be set anywhere within or beyond the cycle time for updating the data in block 20 so long as the new redundancy data 22' is written to the SSD before any further Read-Modify-Write operation is made to block 20/20', or any other block on any of the other data storage units S1–S5, corresponding to the new redundancy data 22'. That is, the redundancy data for a data block in a storage unit must be updated before any other data block in any storage unit that uses the same redundancy data can be modified.

Figure 5:
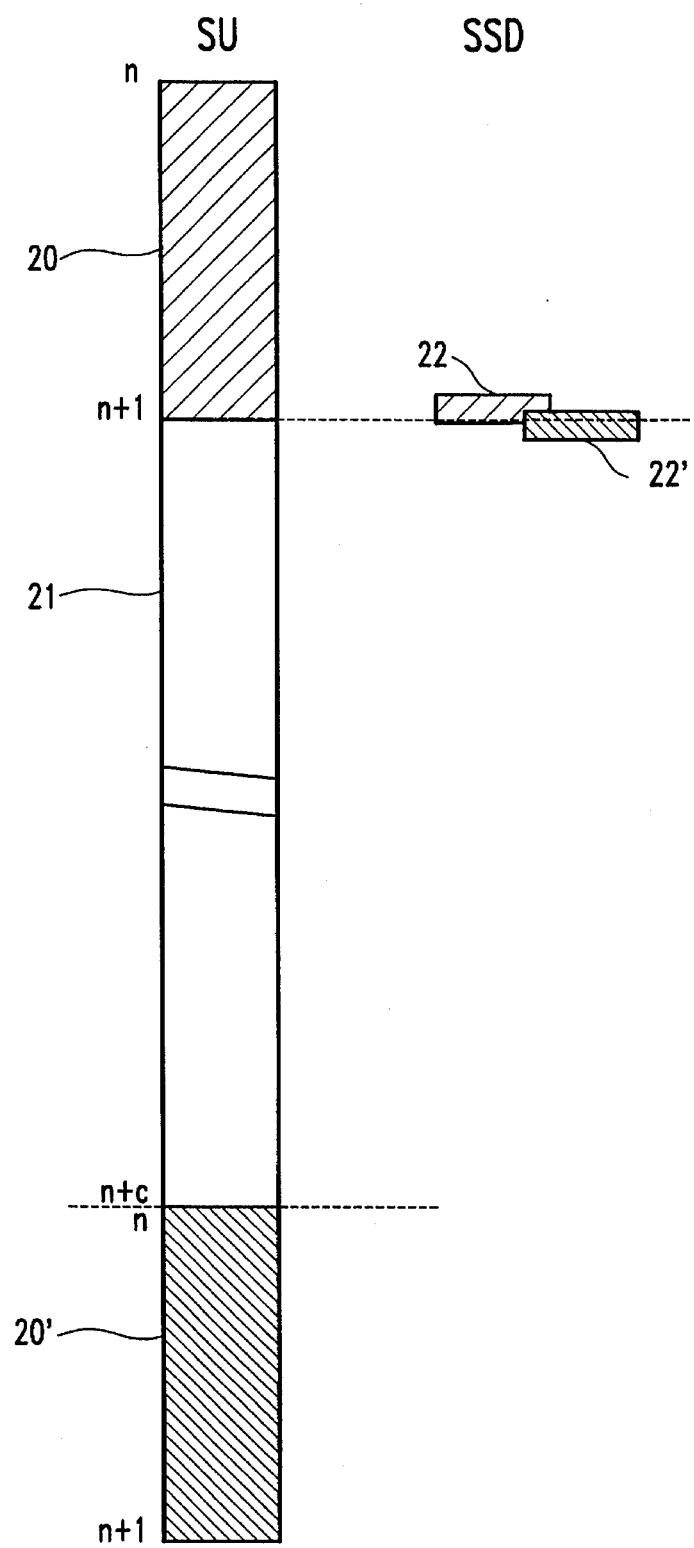
FIG. 5 is a diagram of the operational sequence and relative times typical of a Read-Modify-Write operation in a fourth embodiment of the present invention.

FIG. 5 shows yet another alternative embodiment of the present invention. As in the second embodiment described above, the data Read from the storage unit SU is transmitted to the buffer memory 4 in the controller 3. Further, the Read cycle time for the buffer memory 4 and the process time of the redundancy data computation circuit 5 respectively approximate the Read cycle time from the SSD and the Write cycle time to the SSD from the controller 3. In addition, both the buffer memory 4 and the SSD are dual-port circuits. Therefore, as the remainder of block 20 is Read from the storage unit SU and stored 4 through a first port of the buffer memory 4, the first part of the data from block 20 can be accessed through the second port of the buffer memory 4 and transmitted to the redundancy data computation circuit 5. Meanwhile, the corresponding redundancy data is Read through a first port of the SSD and also transmitted to the redundancy data computation circuit 5. Because the SSD is dual ported, as the new redundancy data is output from the redundancy data computation circuit 5, such data can be concurrently written into the SSD through a second port, thus overlapping the Read and Write operations with respect to the SSD. With suitably synchronized circuitry and full dual-port capability, Writes to the SSD would lag Reads only by the propagation delays of the intervening bus and redundancy data computation circuitry. A variation of this configuration is to use a dual-port SSD but a single-port buffer memory 4. Although the SSD cannot be Read until after the data from block 20 has been transmitted to the buffer memory 4, the Writing of the new redundancy data 22' can be overlapped with Reading of the SSD.

As noted above, a variation of the invention uses a second buffer memory to buffer the redundancy data 22 Read from the SSD, in order to match data rates with the output of a storage unit. Multiple sets of buffer memories may be provided to permit the SSD to continue operation with other data blocks without waiting for a single buffer to clear.

Figure 6:
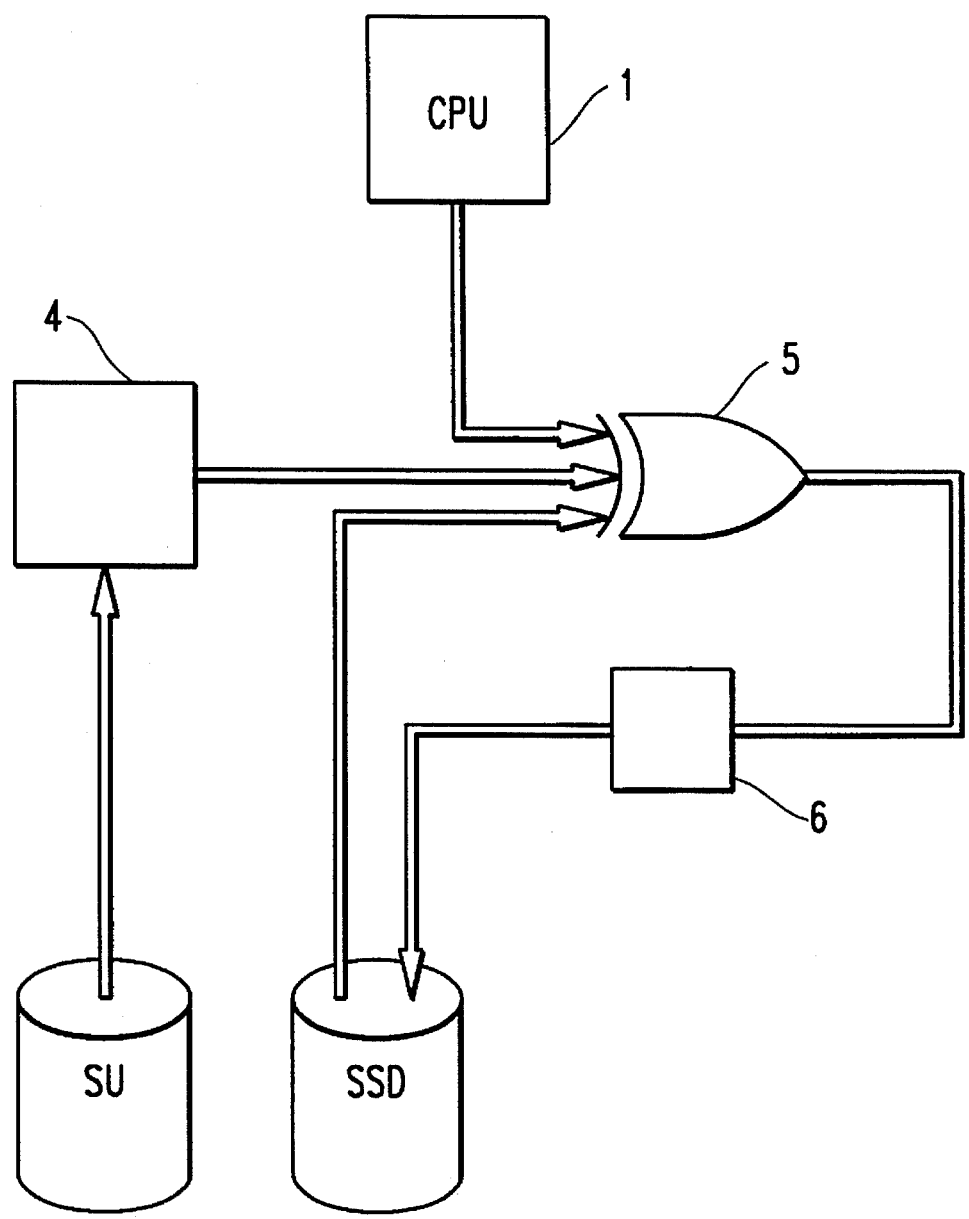
FIG. 6 is a block diagram of one embodiment of the present invention, showing further detail of data flow through a buffer memory and redundancy data computation circuit.

FIG. 6 shows in greater detail the data paths of a basic configuration in accordance with the present invention. Old data from block 20 is Read out of the SU (typically a byte or a multi-byte word at a time) and stored in the buffer memory 4. The old data from the buffer memory 4 is then transmitted to the redundancy data computation circuit 5 (shown here as a three-input XOR gate), along with the new data (from the CPU 1 via the controller 3), and the old redundancy data 22 from the SSD. The newly computed redundancy data 22' output from the redundancy data computation circuit 5 is then transmitted to the SSD, either directly or after buffering in an optional redundancy data buffer 6.

The data input to the redundancy data computation circuit 5 can be serial streams from the three sources, in which case the redundancy data computation circuit 5 can comprise a three-input XOR gate (or two cascaded two-input XOR gates) if the redundancy data is simply parity information. If the data into the redundancy data computation circuit 5 is byte-wide or multi-byte wide, and the redundancy data is simply parity information, the redundancy data computation circuit 5 can comprise parallel sets of three-input XOR gates (or sets of cascaded two-input XOR gates), the sets matching in number the "width" of the input data (e.g., eight sets for byte-wide inputs). As an alternative, the computation of the redundancy data may be done in a general purpose microprocessor under software control.

While the storage unit SU on which a new data block 20' will be stored is involved for the duration of each Read-Modify-Write operation, the involvement of the SSD in the operation ceases upon writing the new redundancy data block 22'. Thereafter, the SSD is available for updating a redundancy data block for a next storage unit SU'. In contrast, both a RAID 4 and a RAID 5 system involve two storage units for the entire duration of each Read-Modify-Write operation, limiting the throughput of either type of system as a whole.

Figure 7:
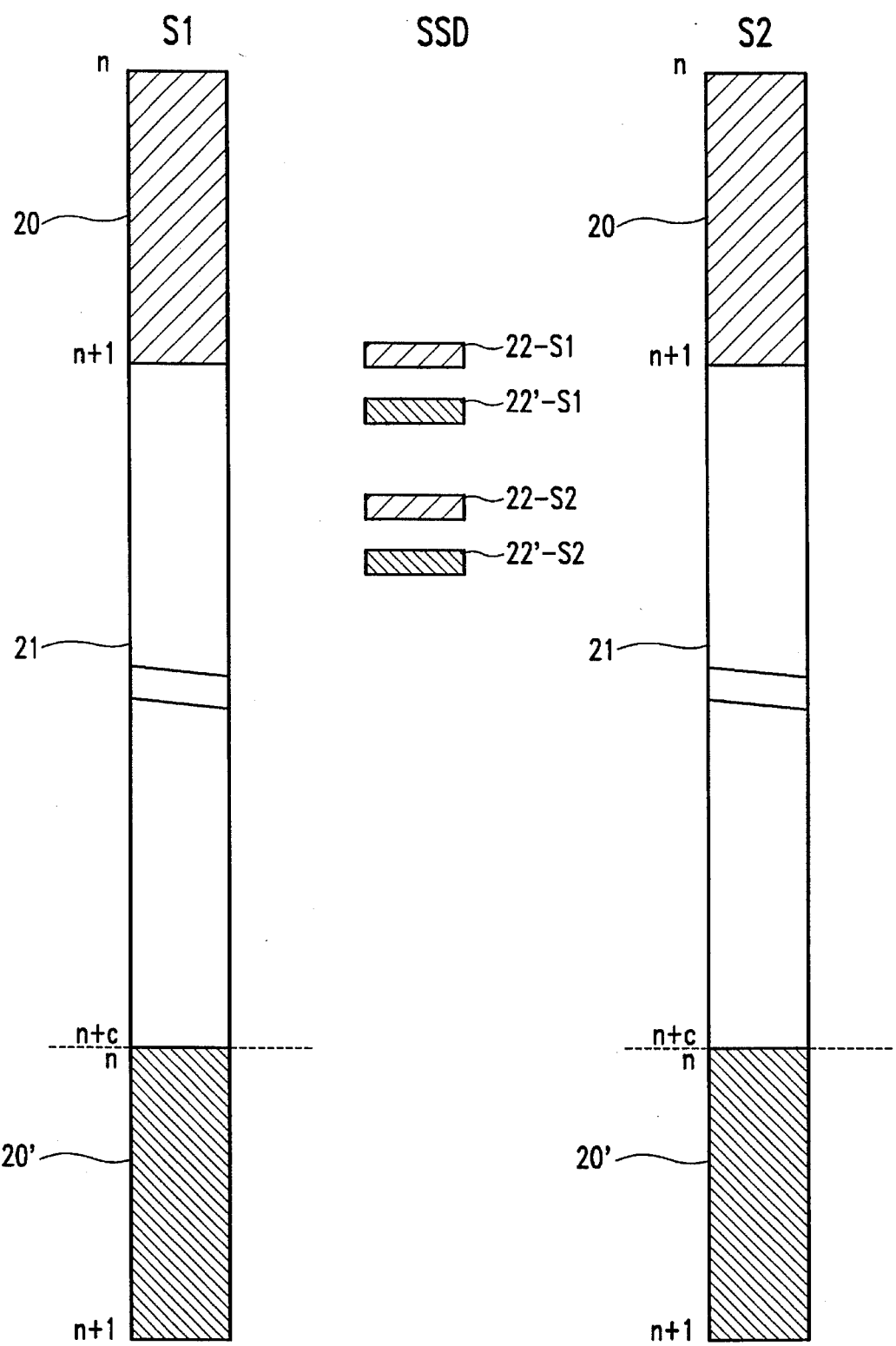
FIG. 7 is a diagram of the operational sequence and relative times typical of a Read-Modify-Write operation involving two storage units in one embodiment of the present invention.

An example of this capability of the present invention is shown in FIG. 7, which shows the operational sequence and relative times typical of a Read-Modify-Write operation involving two storage units, S1 and S2. By flexibly scheduling updates to the SSD, the redundancy data $22_{S1}$ for block $20_{S1}$ can be updated, followed by an update to the redundancy data $22_{S2}$ for the corresponding block $20_{S2}$ (buffering of the redundancy data may be required in order to free the SSD from one update to perform a next; in the illustrated example, the data from storage unit S2 must be buffered so that it is available when the corresponding redundancy data is available to be updated). As the diagrammatic representation indicates, corresponding blocks on each of two independent storage units can be updated in one storage unit Read-Modify-Write operation cycle time, with sufficient capacity for the SSD to update other storage units as well within the same cycle time. In the prior art, updating such corresponding blocks on different storage units would typically require at least two storage unit Read-Modify-Write operation cycle times.

The present invention still requires reading an old data block from a storage unit S1–S5 and an old redundancy data block from the SSD, then combining (e.g., XOR'ing) the old data block, a new data block, and the old redundancy data block to generate a new redundancy data block, and thereafter writing the new data block to a storage unit S1–S5 and the new redundancy data block to the SSD. However, reading the old redundancy data block from the SSD and writing the new redundancy data block to the SSD at electronic speeds takes a negligible amount of time (typically about 300 µs, using 200 ns RAM in the SSD) compared to the Write time of a typical rotating disk storage unit (typically about 1600 µs for a 36-sector/track disk rotating at 3600 rpm).

A number of embodiments of the present invention have been described. Nevertheless, it will be understood that various modifications may be made without departing from the spirit and scope of the invention. For example, an error-correction method other than XOR-generated parity may be used for the computing redundancy data. One such method using Reed-Solomon codes is disclosed in U.S. patent application Ser. No. 270,713, filed Nov. 14, 1988, entitled "Arrayed Disk Drive System and Method" and assigned to the assignee of the present invention. Accordingly, it is to be understood that the invention is not to be limited by the specific illustrated embodiment, but only by the scope of the appended claims.

I claim:

1. A fault-tolerant storage device array including:
   a. a plurality of failure independent data storage units for storing data as blocks;
   b. at least one solid state device storage unit for storing a plurality of redundancy blocks, each redundancy block corresponding to a plurality of data blocks stored in the plurality of failure independent data storage units, and wherein the solid state device storage unit has Read and Write cycle times substantially less than the Read and Write cycle times of the plurality of failure independent data storage units; and
   c. a storage unit controller, coupled to the plurality of failure independent data storage units and to the at least one solid state device storage unit, comprising control means for modifying a data block including means for:
      (1) reading a data block to be modified from one of the failure independent data storage units;
      (2) reading a redundancy block, corresponding to the read data block, from at least one solid state device storage unit;
      (3) generating a new redundancy block from the read data block, the read redundancy block, and a new data block; and
      (4) writing the new redundancy block to the at least one solid state device storage unit.

2. The invention of claim 1, wherein the control means completes reading the redundancy block before completing reading the data block.

3. The invention of claim 1, wherein the control means begins reading the redundancy block after completing reading the data block.

4. The invention of claim 1, wherein the control means further includes means for writing the new data block over the read data block, and the control means completes writing the redundancy block before completing writing the new data block.

5. The invention of claim 1, wherein the control means further includes means for writing the new data block over the read data block, and the control means completes writing the redundancy block before beginning writing the new data block.

6. The invention of claim 1, further including a buffer memory, coupled to the plurality of failure independent data storage units and the storage unit controller, for temporarily storing each data block read from the failure independent data storage units, wherein the control means begins reading the redundancy block after completing reading the data block and temporarily storing the data block in the buffer memory.

7. The invention of claim 1, further including a dual-port buffer memory, coupled to the plurality of failure independent data storage units and the storage unit controller, for temporarily storing data blocks read from the failure independent data storage units by the control means, wherein the control means:
   a. begins reading the redundancy block before completing reading the data block and temporarily storing the data block in the buffer memory through a first port; and
   b. concurrently begins generating the new redundancy block from the new data block, the read redundancy block, and the read data block in the buffer memory, wherein such read data block is accessed through the second port of the buffer memory.

8. The invention of claim 1, further including a buffer memory, coupled to at least one solid state device storage unit and the storage unit controller, for temporarily storing at least one redundancy block read from at least one solid state device storage unit.

9. The invention of claim 1, further including a buffer memory, coupled to at least one solid state device storage unit and the storage unit controller, for temporarily storing at least one new redundancy block to be written to at least one solid state device storage unit.

10. The invention of claim 1, further including:
   a. a dual-port buffer memory, coupled to the plurality of failure independent data storage units and the storage unit controller, for temporarily storing data blocks read from the failure independent data storage units by the control means;
   b. wherein the at least one solid state device storage unit includes dual ports;
   c. wherein the control means:
      (1) begins reading the redundancy block through a first port of at least one solid state device storage unit before completing reading the data block and temporarily storing the data block in the buffer memory through a first port of the buffer memory;
      (2) concurrently begins generating the new redundancy block from the new data block, from the redundancy block, and the data block in the buffer memory, wherein such read data block is accessed through the second port of the buffer memory; and
      (3) concurrently writes the new redundancy block into at least one solid state device storage unit through the second port thereof.

11. The invention of claim 1, including at least two solid state device storage units operated as mirrored pairs of storage units.

12. The invention of claim 1, wherein at least one solid state device storage unit comprises volatile data storage elements powered by a primary power source, and further including a battery-backed power supply for supplying data-preserving power to the volatile data storage elements in the event of a failure of the primary power source.

13. The invention of claim 1, wherein at least one solid state device storage unit further includes error-correction circuitry for detecting and correcting at least single-bit errors in words of data stored therein.

14. The invention of claim 1, wherein at least one solid state device storage unit comprises non-volatile data storage elements.

15. A fault-tolerant storage device array including:
   a. a plurality of failure independent data storage units for storing a plurality of data blocks;
   b. at least one solid state device storage unit for storing at least one redundancy block, each redundancy block corresponding to a portion of the plurality of data blocks, wherein the solid state device storage unit has Read and Write cycle times substantially less than the Read and Write cycle times of the plurality of failure independent data storage units; and
   c. a storage unit controller, coupled to the plurality of failure independent data storage units and to the at least one solid state device storage unit, wherein the controller generates a new redundancy block corresponding to a new data block which is to replace an old data block stored on the plurality of failure independent data storage units, and wherein the new redundancy block is a function of the old data block, an old redundancy block corresponding to the old data block, and the new data block.

16. A fault-tolerant storage device array including:
   a. a plurality of failure independent data storage units for storing a plurality of data blocks;
   b. at least one solid state device storage unit for storing at least one redundancy block, each redundancy block corresponding to a portion of the plurality of data blocks, wherein the solid state device storage unit has Read and Write cycle times substantially less than the Read and Write cycle times of the plurality of failure independent data storage units; and
   c. a storage unit controller, coupled to the plurality of failure independent data storage units and to the at least one solid state device storage unit, wherein the controller generates a new redundancy block each time an old data block stored on the plurality of failure independent data storage units is modified, and wherein the new redundancy block is a function of the old data block, an old redundancy block corresponding to the old data block, and a new data block.

17. A method of storing a new block of data in a fault-tolerant storage device array including:
   a. selecting one of a plurality of failure independent data storage units for storing the new data block;
   b. reading an old data block, corresponding to the new data block, from one of the failure independent data storage units;
   c. reading an old redundancy block, corresponding to the old data block, from at least one solid state device storage unit, wherein the solid state device storage unit has Read and Write cycle times substantially less than the Read and Write cycle times of the plurality of failure independent data storage units;
   d. generating a new redundancy block from the old data block, the old redundancy block, and the new data block;
   e. writing the new redundancy block to at least one solid state device storage unit; and
   f. writing the new data block to the selected one of the plurality of failure independent data storage units.

18. A method of storing a new block of data in a fault-tolerant storage device array including:
   a. selecting one of a plurality of failure independent data storage units for storing the new data block;
   b. reading an old data block, corresponding to the new data block, from the selected failure independent data storage unit;
   c. reading an old redundancy block, corresponding to the old data block, from at least one solid state device storage unit, wherein the solid state device storage unit has Read and Write cycle times substantially less than the Read and Write cycle times of the plurality of failure independent data storage units;
   d. generating a new redundancy block, wherein the new redundancy block is a function of the old data block, the old redundancy block, and the new data block;
   e. writing the new redundancy block to the at least one solid state device storage unit; and
   f. writing the new data block to the selected one of the plurality of failure independent data storage units.

* * * * *